Jan. 27, 1925.

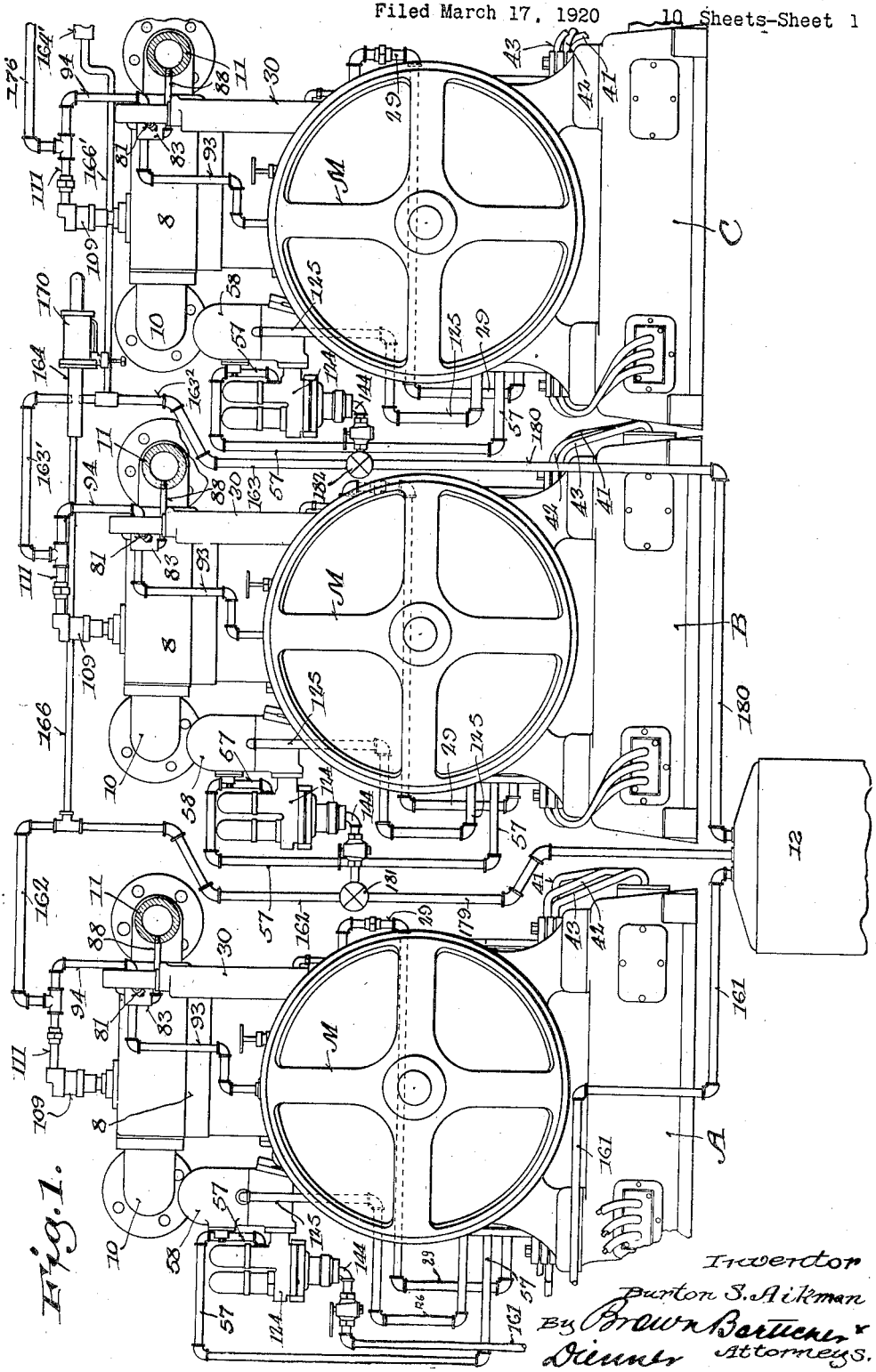

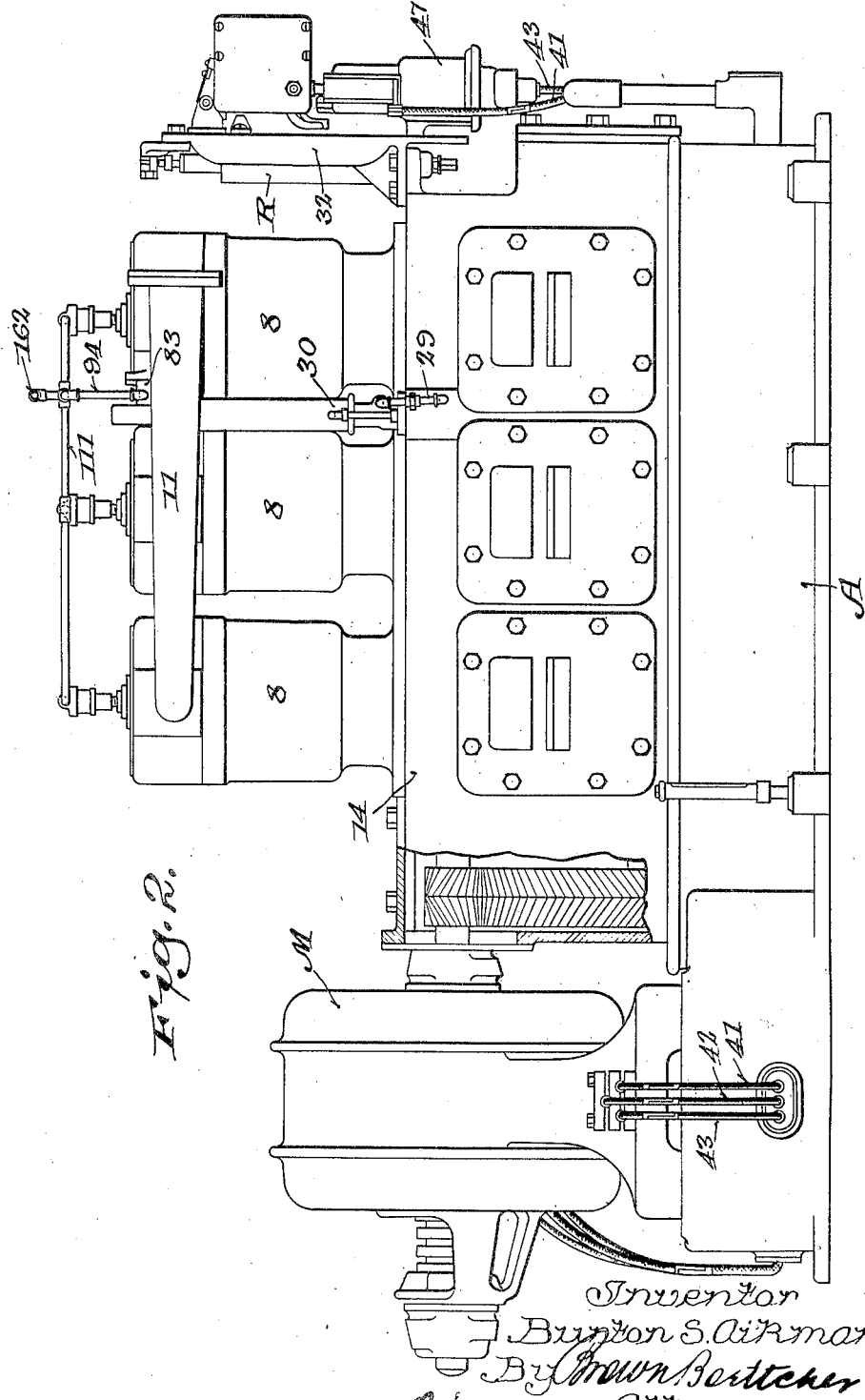

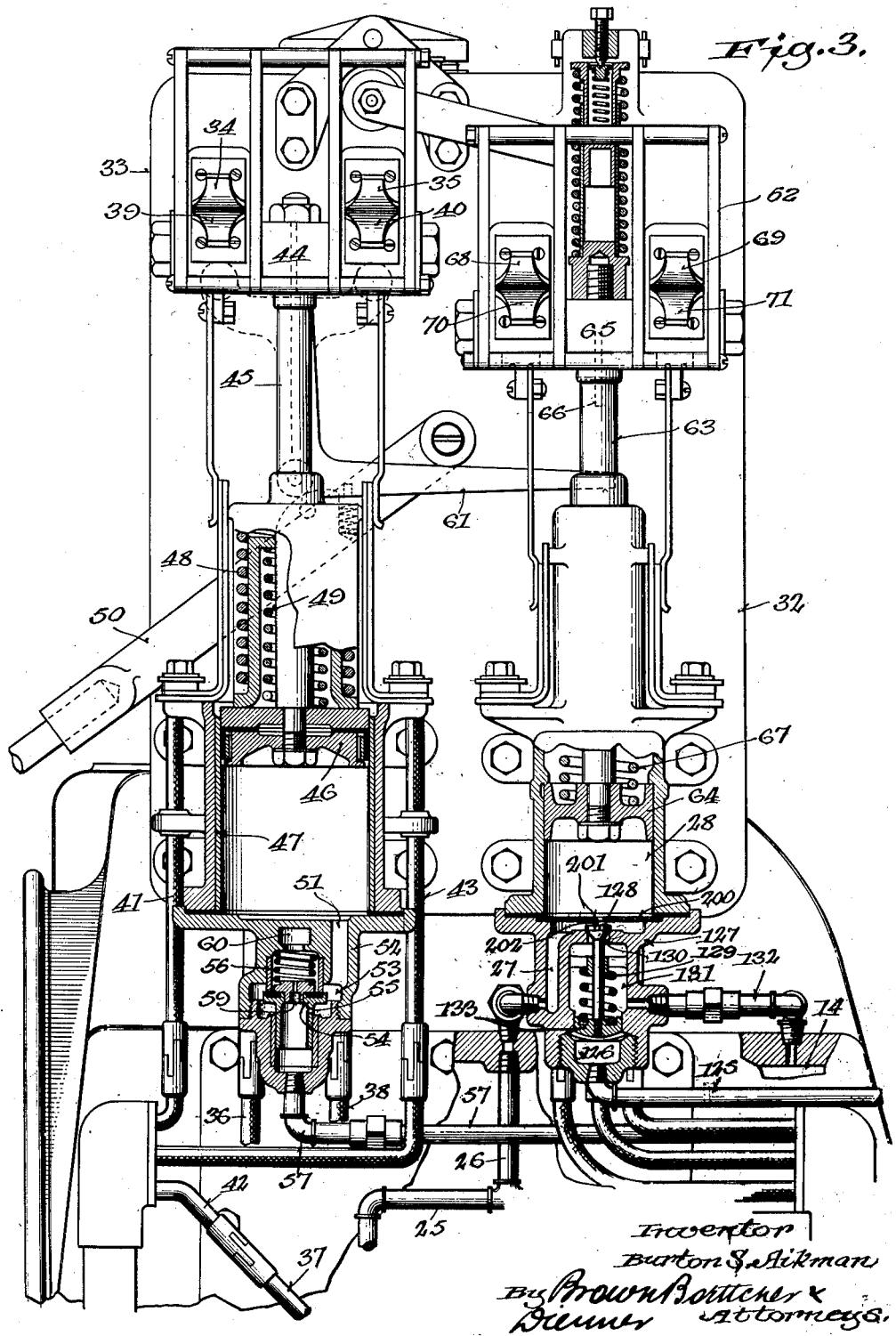

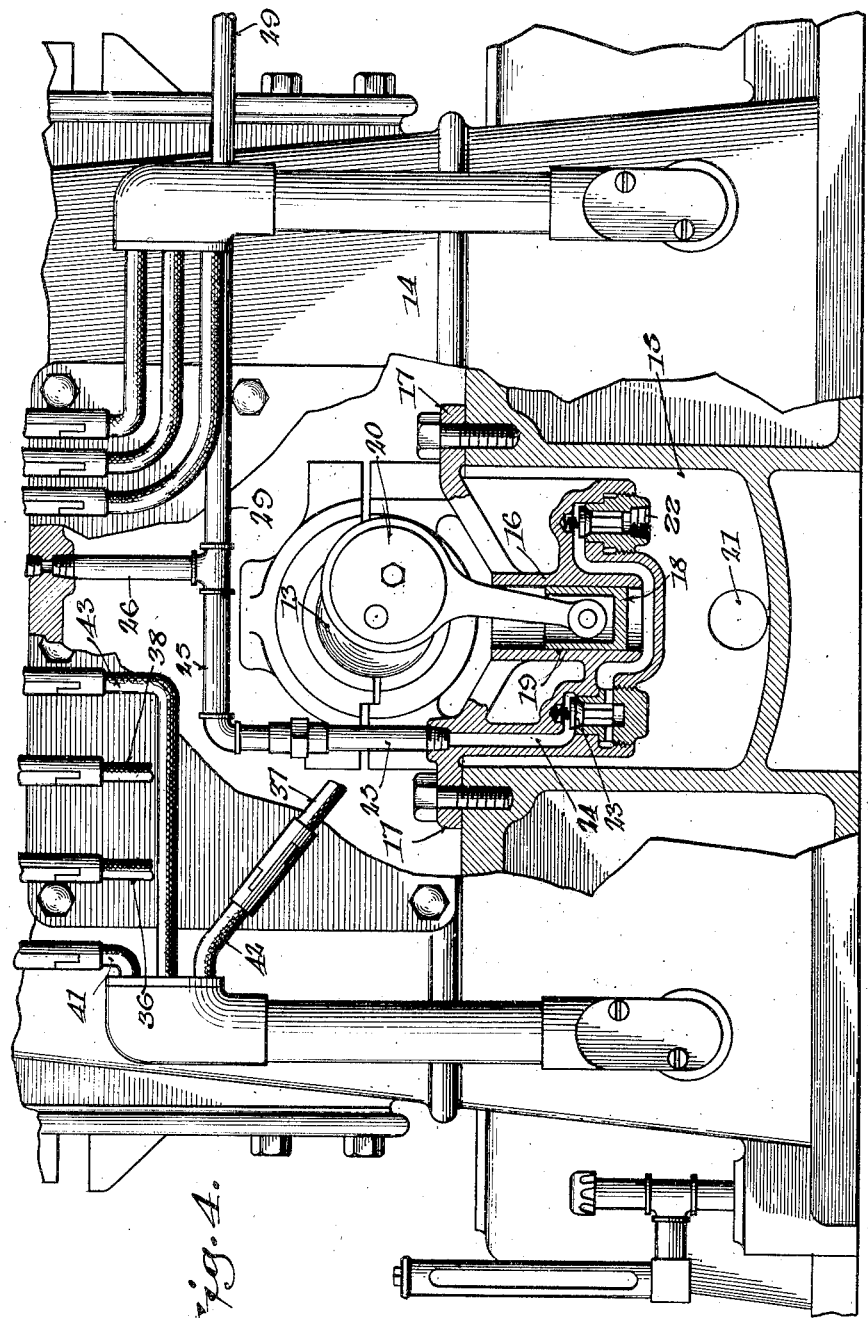

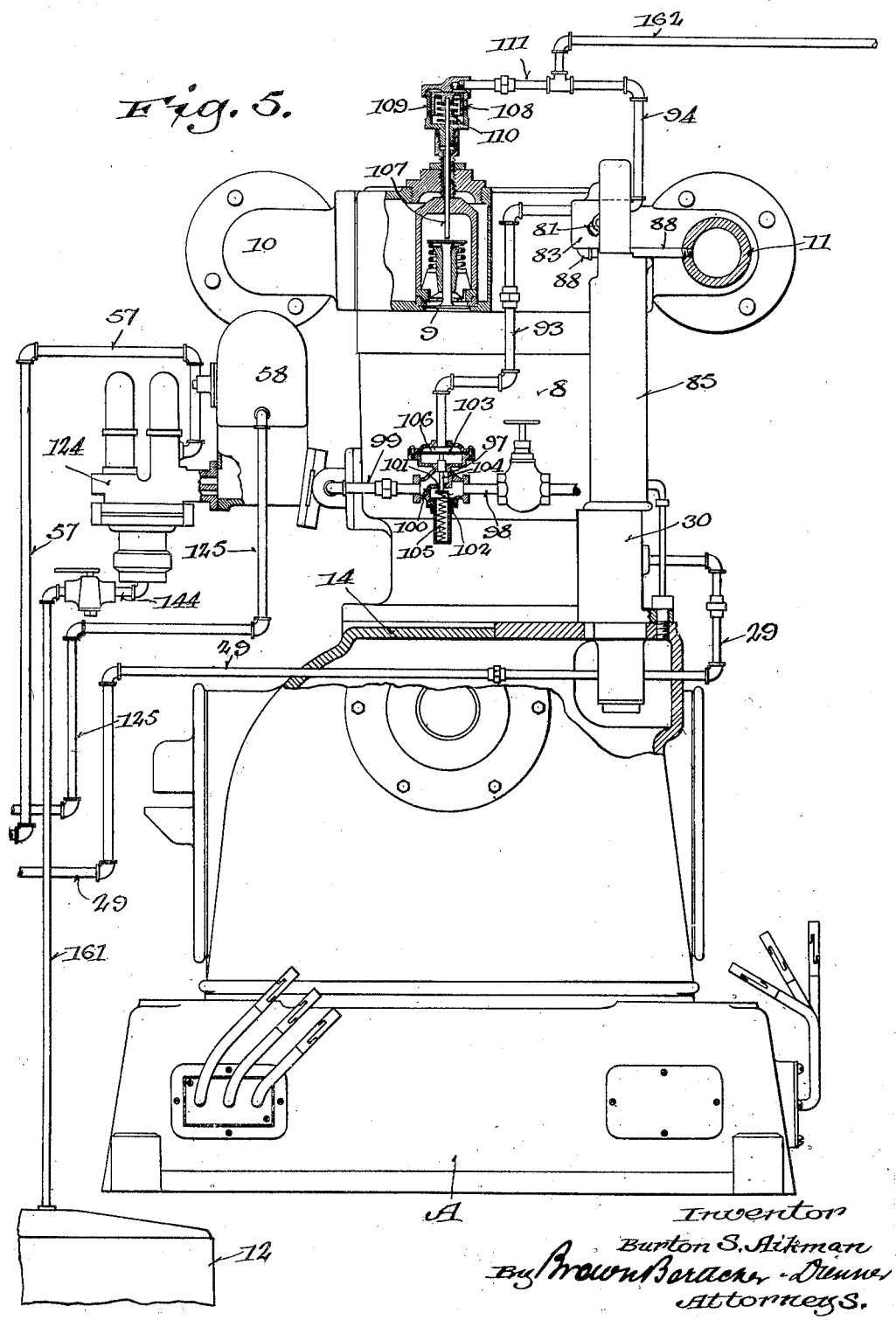

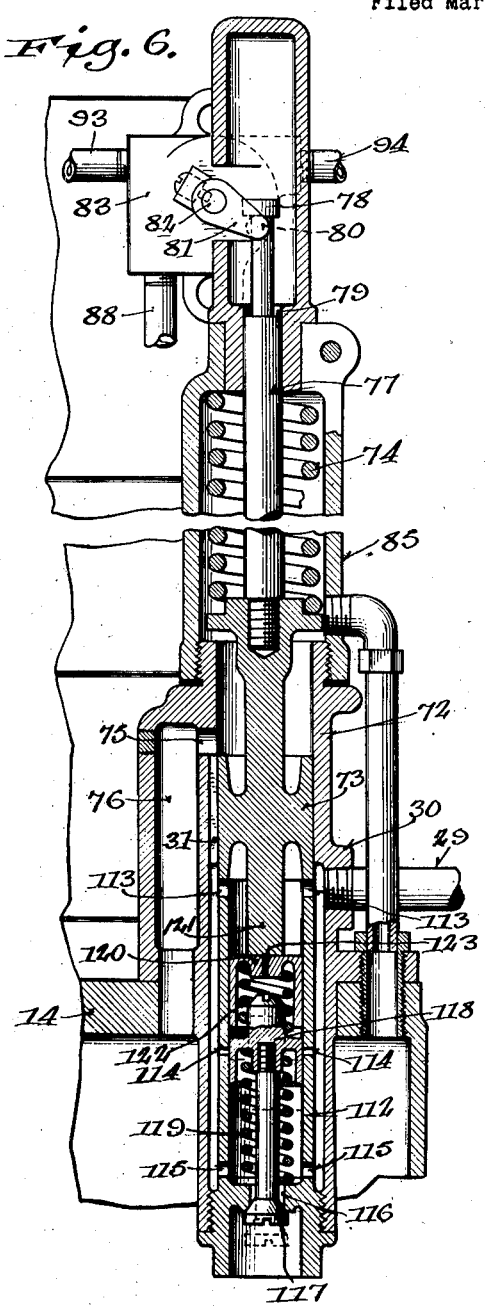

B. S. AIKMAN 1,524,076

SYNCHRONIZER FOR COMPRESSORS AND THE LIKE

Filed March 17, 1920    10 Sheets-Sheet 7

Inventor
Burton S. Aikman
By Brown, Boucher-Denny
Attorneys.

Jan. 27, 1925.
B. S. AIKMAN
1,524,076
SYNCHRONIZER FOR COMPRESSORS AND THE LIKE
Filed March 17, 1920   10 Sheets-Sheet 8
Fig. 10.
Fig. 11.
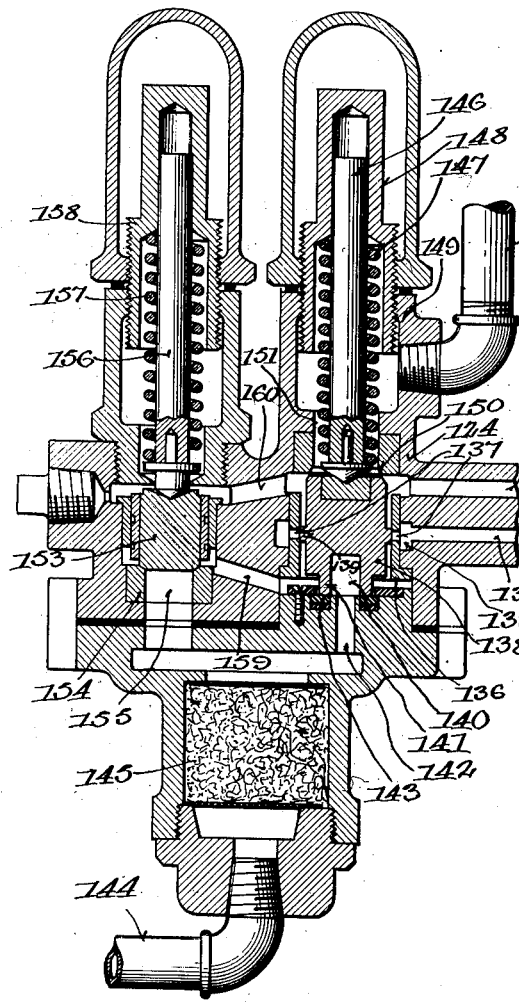
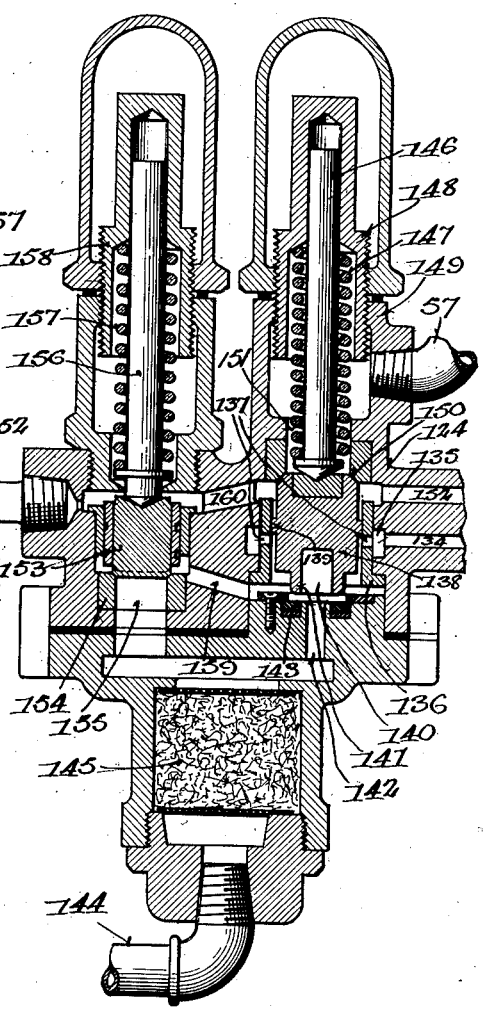
Inventor
Burton S. Aikman
By Brown, Boettcher, Dienner
Attorneys.

Jan. 27, 1925.  
B. S. AIKMAN  
1,524,076  
SYNCHRONIZER FOR COMPRESSORS AND THE LIKE  
Filed March 17, 1920   10 Sheets-Sheet 9
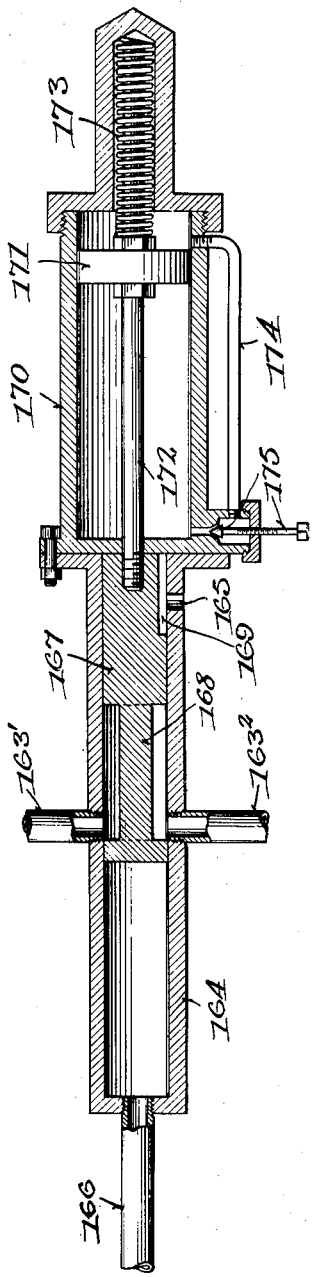
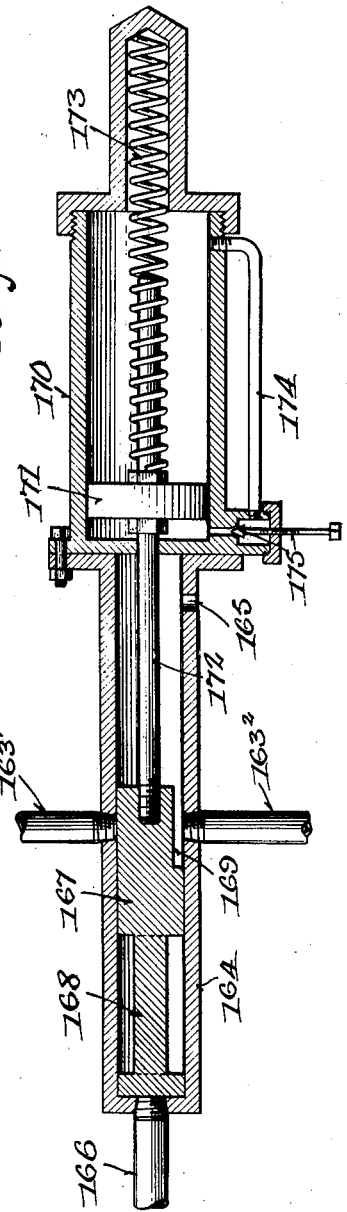
Inventor  
Burton S. Aikman  
By Brown Bortlens Dunne  
Attorneys.

Jan. 27, 1925.
B. S. AIKMAN
1,524,076
SYNCHRONIZER FOR COMPRESSORS AND THE LIKE
Filed March 17, 1920  10 Sheets-Sheet 10
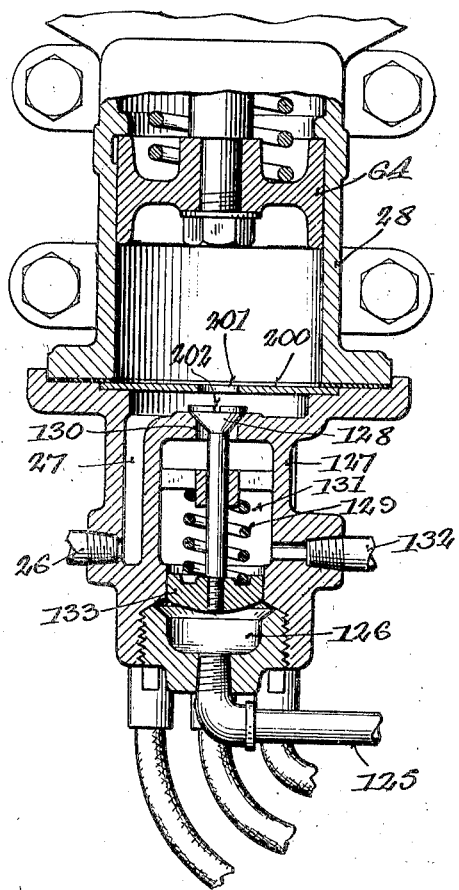
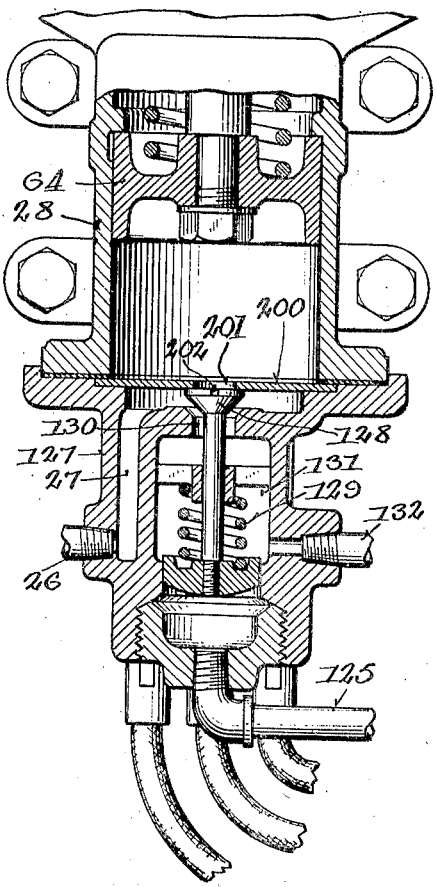
Inventor
Burton S. Aikman
By Brown...
Attorneys.

Patented Jan. 27, 1925.

1,524,076

UNITED STATES PATENT OFFICE.

BURTON S. AIKMAN, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

SYNCHRONIZER FOR COMPRESSORS AND THE LIKE.

Application filed March 17, 1920. Serial No. 366,621.

*To all whom it may concern:*

Be it known that I, BURTON S. AIKMAN, a citizen of the United States, residing at Milwaukee, in the county of Milwaukee and State of Wisconsin, have invented a certain new and useful Improvement in Synchronizers for Compressors and the like, of which the following is a full, clear, concise, and exact description, reference being had to the accompanying drawings, forming a part of this specification.

This invention relates to synchronizers for compressors and the like.

It is common practice to employ several independently driven machines or units for establishing and maintaining a working pressure in a given power system. This is ordinarily accomplished by means of governing mechanisms for controlling the starting and stopping of the machines or units in accordance with the pressure in the system so that when the pressure falls below a certain predetermined degree the machines or units are automatically started and the pressure is built up, and when the pressure has reached a predetermined maximum degree the machine or units are brought to rest.

Considerable difficulty has heretofore been experienced however in insuring the starting and stopping of all of the units at the proper times due to the apparent inability of obtaining a sufficiently precise adjustment of the several governing mechanisms. For instance should the governing mechanism of each unit be set so as to start each unit when the pressure in the system has fallen to say sixty pounds, it has been found that one or two of the governing mechanisms may operate to start their units at that pressure but that the other governors frequently fail to operate at this time due to mechanical friction or other conditions peculiar to each governor. When this occurs the unit or units which have been started build up or maintain the pressure in the system at such point that the other units fail to start. The unit or units which have been started are thus caused to take the entire load. The same difficulty has been experienced when it comes to stopping the several units.

The general aim of the present invention is to provide a means that will insure the desired starting and stopping of all of the units that may be in operative condition and thus effect a substantially equal distribution of the work performed by all. This may be accomplished by the provision of means which will place any of the several units under the control of the pressure in the system and at the same time make the several units so interdependent that the above described objectionable condition cannot occur.

Another object of the invention is to insure the successive starting of the several units. This is particularly advantageous when each unit is driven by a separate motor and all the motors are driven from a common power circuit, since the heavy drain imposed upon the power circuit, should all the motors be started simultaneously, is thus avoided. This is accomplished by making each unit serve as a pilot for controlling the starting and stopping of another unit.

Although the invention is applicable to various other uses it has been applied and operated successfully in connection with fluid compressors such as described in my copending application Serial No. 169,997 filed May 21, 1917. In that application a control system is described by which the operation of a compressor is not only controlled by the fluid pressure in the air container fed thereby but also by the operative condition of the compressor or its driving means so that in the event that the compressor is not in proper working condition it will not operate.

A still further object of the present invention is therefore, the provision of means whereby the starting or stopping of any unit may be controlled by the prior starting or stopping of any other unit. Thus if any unit has been started by a drop in pressure in the power system, the starting of this unit will cause the starting of all the other units that are in proper working condition. Therefore, should any unit fail to operate due to its inoperative condition, it will not prevent the starting of successive units that may be in an operative condition.

Other objects and advantages will hereinafter appear.

One embodiment of the invention will be described as applied to a plurality of compressors similar to those described in the application above referred to.

The views of the drawings are as follows:

Figure 1 is a view in end elevation of three compressors and illustrating the application of one form of the invention thereto.

Figure 2 is a side elevation of one of the compressors illustrated in Figure 1.

Figure 3 is a fragmentary view, on a larger scale, showing the upper portion of the switch-board end of one of the compressors.

Figure 4 is a fragmentary view showing the lower portion of the end of the compressor shown in Figure 3.

Figure 5 is an elevation of the opposite end of the compressor from that shown in Figures 3 and 4. This view is on a somewhat smaller scale than that employed in Figures 3 and 4.

Figures 6 and 7 are vertical sections, on a larger scale, through an accumulating cylinder employed, and illustrating two different positions of the parts contained therein.

Figures 10 and 11 are vertical sections through the governor employed and illustrating different positions of the parts thereof.

Figures 12 and 13 are longitudinal sections through a certain valve and dash-pot mechanism employed and illustrating two extreme positions of these parts.

Figures 14 and 15 are vertical sections through a switch operating cylinder shown in Figure 3.

Figure 8:
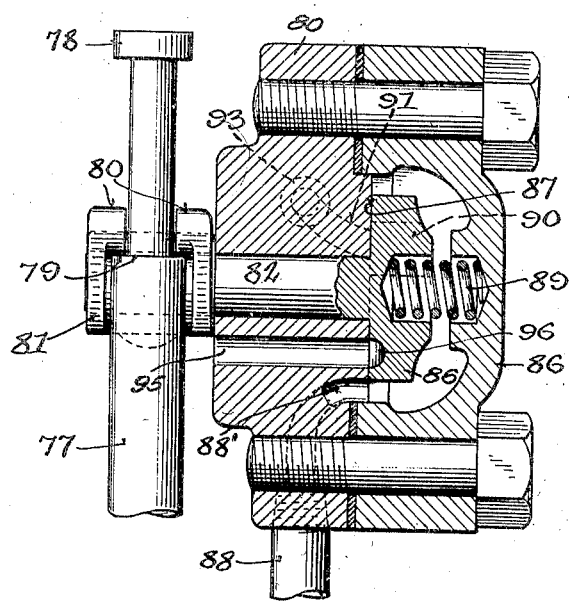
Figure 8 is a vertical section through a certain valve mechanism.

The three compressors A, B and C illustrated in Figure 1 may be of any standard or approved type. In the present instance each is substantially the same as that shown in the application above referred to and includes a plurality of compressor cylinders 8, each having a fluid inlet valve 9 communicating with an intake manifold 10 and a fluid outlet valve (not shown) communicating with an outlet manifold 11. The outlet manifold 11 of each compressor communicates with and feeds a common fluid container such as a reservoir 12. The compressor pistons (not shown) are driven from a crank shaft 13, mounted in a closed crank case 14, so that upon rotation of the crank shaft fluid is drawn in through the inlet valves and delivered through the outlet valves and manifolds 11 to the reservoir 12 in a well known manner. Since compressors of this general type are well known in the art, a further or more detailed description thereof is deemed unnecessary.

Each compressor is controlled by an individual system similar in many respects to that described in the application above referred to. This system includes a fluid pressure governor and a hydraulic system for starting and stopping and for loading and unloading the compressor. This hydraulic system preferably constitutes the lubricating system for the compressor so that the starting or continued operation of the compressor is impossible in the event that the lubricating system is not functioning properly due to lack of lubricant or for any other cause. Furthermore the hydraulic system depends for its action upon the hydraulic pressure set up therein during the normal operation of the compressor so that should the compressor or its driving means fall below its normal speed the consequent reduction in pressure automatically effects the stopping of the compressor. The loaded or unloaded condition of the compressor is also dependent on the pressure set up in this hydraulic system so that the compressor is not loaded until it approaches its working speed and is again unloaded before it is brought to rest.

This hydraulic system and its connections with the various parts of the compressor and its driving means will now be described. This system is fed from the usual bath of oil contained in the crank case 14, by means of a pump of any approved type, driven preferably from the crank shaft 13. In the present instance a well 15 is formed near one end of the crank case to receive the pump 16 which is held in position therein by means of suitable ears 17 formed on the pump frame. The pump includes a piston 18 operable in a cylinder 19 and actuated by an eccentric 20 secured to one end of the crank shaft 13. Oil from the crank case enters the well 15 through an opening 21 and assumes a level corresponding to the level of the oil in the crank case.

The pump inlet valve 22 communicates with this body of oil at a point slightly below the normal level thereof so that during the operation of the pump, oil is drawn through valve 22 into the pump and is then forced out through the valve 23 to a passageway 24 communicating with a pipe 25. Pipe 25 feeds the hydraulic system. When the level of oil falls below the intake of valve 22 the supply to the hydraulic system is cut off and the compressor is stopped by mechanism which will be later explained.

Pipe 25 communicates with a pipe 26, which in turn leads to a passageway 27 formed in the bottom of a switch cylinder 28 (see Fig. 3) to effect the closing of a resistance cut-out switch, as will be later explained. Pipe 25 also communicates with a pipe 29, which in turn leads to an accumulating cylinder 30 for effecting the loading and unloading of the compressor. A narrow duct 31 formed in the wall of the cylinder 30 permits an escape of some of the oil to and through a port 75 and through a passageway 76 back to the crank case 14. (See Figures 6 and 7.) The pressure of the oil in pipes 25, 26 and 29 thus varies with the speed of the pump and consequently with the speed of the compressor.

Each compressor is driven by an electric motor M operatively connected at all times with the crank shaft 13, so that the operation of the compressor depends upon the operation of the motor. The switch mechanism for controlling the motor is fully described in my copending application above referred to and in my copending application Serial No. 335815 filed November 5, 1919. It will be sufficient for the present purposes to understand in a general way the operation of this switch mechanism and its relation with the hydraulic system.

This mechanism is preferably mounted upon a suitable switch board 32 conveniently mounted upon one end of the compressor. (See Figures 2 and 3.) The motor is started or stopped by closing or opening the main switch 33. The main switch includes a plurality of fixed contacts 34 and 35 electrically connected with the main feed wires 36 and 38, respectively. The movable contacts 39 and 40 are electrically connected with the motor through the leads 41 and 43, respectively. The third feed wire 37 is connected directly with the lead 42 of the motor. Thus it will be seen that the closing of the main switch closes the circuit between the power circuit and the motor.

The movable contacts 39 and 40 are carried upon a cross-head 44 actuated by a plunger 45. Plunger 45 is connected with a piston 46 operable in a cylinder 47. Springs 48 and 49 tend at all times to hold the switch open. The switch however may be closed by a manual manipulation of a lever such as shown at 50 or by the admission of fluid under pressure to the bottom of the cylinder 47.

Fluid is admitted to the cylinder through a passageway 51 formed in the cylinder head 52 and communicating with an annular chamber 53. A hollow cylindrical valve member 54 is reciprocably mounted in the cylinder head and is provided with a port 55 adapted to be positioned in and out of communication with the annular chamber 53. A spring 56 yieldably maintains the valve member in such position as to close port 55. When fluid is admitted through pipe 57, beneath the valve member, the valve member is lifted and the fluid passes through the port 55 to and through the passageway 51 and enters the cylinder. The piston 46 is thus raised against the action of springs 48 and 49 and the main switch is closed.

Pipe 57 is connected with an auxiliary reservoir 58 which will be later described. This reservoir has a limited capacity. Valve member 54 is provided with a bleed opening 59 permitting a slow escape of the fluid from the pipe 57 and reservoir 58 through an exhaust passage 60. The capacity of the auxiliary reservoir is such as to effect a complete closure of the main switch and in fact to hold the switch closed for a predetermined time interval. At the end of this period however sufficient fluid has escaped through the bleed opening 59 to reduce the pressure to such a point as to permit the valve member 54 to be forced down under the action of the spring 56. This opens communication between the exhaust passage 60 and the passageway 51, permitting an exhaust of the fluid in the cylinder 47. When this occurs the piston 46 is free to drop under the action of the springs 48 and 49 to open the switch.

A latch member in the form of a bell-crank lever 61 is provided however for holding the main switch closed in the event that proper working pressure has been established in the hydraulic system. Thus if the compressor has come up to the desired speed within the proper time interval the latch is moved to latching position and the main switch is held closed.

The mechanism for controlling the latch lever 61 also controls the cut-out switch 62. This mechanism includes a plunger 63 connected at one end to an actuating piston 64 and carrying at its other end a movable cross-head 65. One arm of the lever 61 extends across the path of movement of a projection 66 carried by the cross-head so that when the cross-head 65 is in its lower position the projection 66 holds the lever 61 from its latching position but as the cross-head 65 is raised the lever is free to swing to its latching position beneath the cross-head 44 of the main switch to hold the main switch closed.

The piston 64 is yieldably maintained in its lowermost position by the spring 67. After the main switch has been closed and as the compressor comes up to speed the pressure in the pipes 25 and 26 is increased in the manner hereinabove described. This creates a corresponding pressure in the passage 27 and the bottom of the cylinder 28 until the piston 64, plunger 63 and cross-head 65 are moved toward and held in their uppermost position against the action of spring 67. It will be understood that if the compressor and its driving means are in proper working condition, and sufficient oil is in the crank case, the cross-head 64 will be thus raised and the latch lever thrown to latching position to hold the main switch closed before the main switch has been released by the reduction in pressure in the pipe 57 and the auxiliary reservoir 58. Thus the continued operation of the motor and the compressor is insured. Should, however, the hydraulic pressure at any time fall below an operative minimum the piston 64, plunger 63 and cross-head 65 would fall under the action of spring 67, the latch lever 61 would be tripped to releasing position and the main switch would open. The opening of the main switch breaks the motor circuit and consequently stops the compressor.

The cut-out switch comprises a plurality of fixed contacts 68 and 69 for cooperation with a plurality of movable contacts 70 and 71, carried by the movable cross-head 65, so that when the plunger 63 moves to its uppermost position the cut-out switch is closed. The function of the cut-out switch is to gradually vary the effect of a starting resistance R (Figure 2) during its movement toward and from closing position and to short circuit the resistance by the closing of the switch after the motor has come up to speed. The construction and operation of this cut-out switch and the starting resistance is fully described in both of the copending applications hereinabove referred to.

The accumulating cylinder 30 and associated parts will now be described (see Figs. 6 and 7). The cylinder is provided with an upper reduced portion 72 containing a reciprocable piston 73, yieldably retained in the lower position shown in Figure 6 by a spring 74 when the compressor is at rest. As hereinabove pointed out, oil from the pump 16 passes through pipes 25 and 29 and enters the bottom of the cylinder 30. As the speed of the compressor builds up the pressure of the oil increases until is overcomes the resistance of the spring 74 and causes the piston 73 to move upwardly to the position shown in Figure 7. The relative strengths of the springs 67 and 74 are preferably such that this upward movement of piston 73 does not occur until after piston 64 has reached the extreme upper position of Figure 3 and the cut-out switch has been closed. Likewise as the hydraulic pressure in the cylinder decreases the spring 74 forces the piston 73 to its lower position before the cut-out switch piston 64 has been forced downwardly by the spring 67.

The piston 73 performs several functions. It serves as a relief valve for the hydraulic system by permitting an escape of the oil through the port 75 and passageway 76 back to the crank case 14. By reciprocation over the duct 31 it prevents the accumulation of dirt or other sediment therein. It also serves as a control for a certain valve mechanism for effecting the loading and unloading of the compressor and the supply of water to the cooling system. It also operates another valve mechanism to vent the hydraulic system and thus effect the unloading and stopping of the compressor.

This piston carries a rod 77 having a head 78 and a shoulder 79 engageable with a pair of projections 80 on a valve operating lever 81. Lever 81 is fixed to a rock shaft 82 (see Fig. 8) mounted in a suitable valve casing 83 and rigidly connected with a valve disk 84. The valve casing is preferably mounted upon the spring housing 85 of the accumulating cylinder 30 and is provided with a cover 86 preferably removably secured thereto. One wall 87 of the casing forms a convenient seat for the valve disk 84. The interior of the casing 83 is always in communication with the outlet manifold 11 through a pipe 88 and a port 88' so that the pressure therein corresponds at all times with the pressure in the reservoir 12. The valve disk 84 is held against its seat 87 by the pressure thus created in the valve casing and also by the action of a spring 89. A suitable port 90 extending through the valve disk is adapted for communication with either of two ports 91 and 92 formed in the wall 87 of the casing. A pipe 93 connects port 91 with a mechanism for controlling the supply of water to the cooling system for the compressor, while a pipe 94 connects the other port 92 with a mechanism for loading and unloading the compressor. An atmospheric duct 95 is formed through the wall 87 of the valve casing and communicates at all times with an arcuate groove 96 formed in the under side of the valve disk. This groove is adapted for communication with either of the ports 91 or 92.

Figure 9:
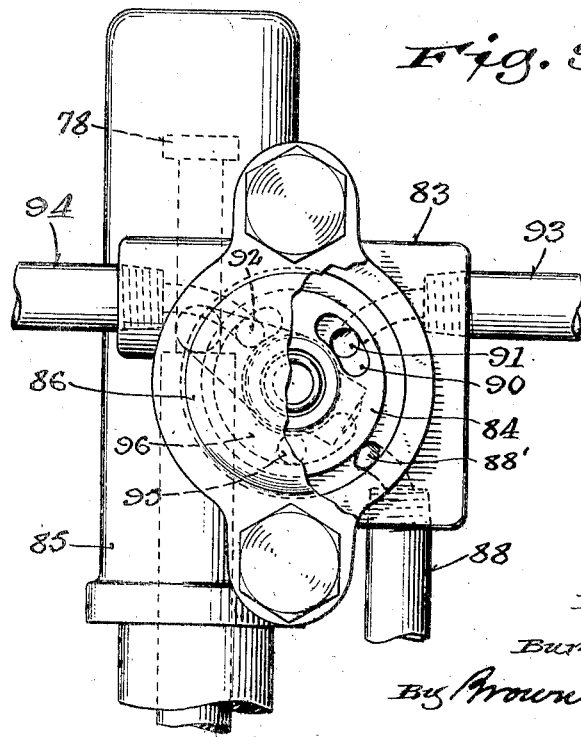
Figure 9 is an end elevation partly in section of the valve mechanism shown in Figure 8.

Thus when the valve disk is in the position shown in Figures 8 and 9, air entering the valve casing 83 through pipe 88 passes through the port 91 in the valve disk and enters the pipe 93 to the water controlling valve mechanism. At the same time the pressure in the pipe 94 has been reduced to atmospheric pressure through the groove 96 and duct 95. By an oscillation of the valve disk in a counterclockwise direction (Figure 9), port 90 is caused to register with port 92 and groove 96 is caused to register with port 91 so that the fluid in pipe 94 is then placed under reservoir pressure and the fluid pressure in pipe 93 is reduced to atmospheric pressure.

The position of the valve disk is of course, determined by the position of the lever 81 which is controlled by the rod 77 carried by piston 73. Thus it will be understood that when the piston 73 moves upwardly under the hydraulic pressure in the accumulating cylinder 30 the valve disk 84 is oscillated to the position shown in Figures 8 and 9 by the engagement of the shoulder 79 against the projections 80 on the lever 81. When the piston moves downwardly the head 78 engages the projections 80 on the lever 81 and oscillates the valve disk to such position as to establish communication between the pipe 93 and groove 96 and between the pipe 94 and port 90.

Various means may be provided for controlling the supply of water to the cooling system of the compressor under the action of the fluid pressure in pipe 93. In the present instance this means includes a valve casing 97 (see Fig. 5) communicating with a water supply main 98 and with a pipe 99 for delivering the water to the system. The interior of the valve casing is divided by a partition 100 having a valve port 101 therethrough controlled by a valve 102. Valve 102 is operatively connected with a flexible diaphragm 103 by means of a stem 104. A compression spring 105 tends at all times to move the valve to closing position. A chamber 106 formed above the diaphragm is at all times in communication with the pipe 93 so that when air under high pressure is admitted to the pipe 93 the diaphragm is moved downwardly and the valve 102 is forced to open position. As soon as the pressure is again reduced in pipe 93 the spring 105 returns the valve to closing position and the supply of water to the cooling system is cut off.

Various means may be provided for effecting the loading and unloading of the compressor in accordance with the fluid pressure in pipe 94. In the present instance this means includes a rod 107 reciprocably mounted adjacent an inlet valve 9 of each compressor cylinder. Each rod is connected with and actuated by a piston 108 reciprocable in a cylinder 109 mounted upon each compressor cylinder 8. A compression spring 110 tends to maintain the piston 108 and rod 107 in the uppermost position of Figure 5. A pipe 111 effects constant communication between the interior of each cylinder 109 and the pipe 94 so that when a high fluid pressure is established in pipe 94 each piston 108 and rod 107 are forced downwardly to lower and hold each inlet valve off its seat and thus destroy the compression in each compressor cylinder and unload the compressor. As soon as the pressure is reduced in pipe 94 each piston 108 and rod 107 is again forced upwardly under the action of spring 110, and each inlet valve 9 is again free to perform its usual functions and the compressor is loaded.

The means for venting the hydraulic control system by the action of the piston 73 will now be described. The accumulating cylinder 30 is constructed to receive an auxiliary cylinder 112 beneath the piston 73. This auxiliary cylinder is provided with three sets of ports 113, 114 and 115 through the cylindrical wall thereof and a valve port 116 in the bottom thereof. A vent valve 117 controls the passage of oil through the valve port 116. The valve is controlled by an auxiliary piston 118 reciprocable in the auxiliary cylinder and normally pressed upwardly by a compression spring 119 to hold the vent valve closed. A second auxiliary piston 120 is mounted in cylinder 112 so as to be engaged by a flat ended projection 121 formed on the main piston 73 under certain conditions. The auxiliary piston 120 is yieldably pressed upwardly by a spring 122 interposed between the two auxiliary pistons. A small port 123 is formed through the auxiliary piston 120 in alinement with the projection 121.

Spring 122 is considerably weaker than spring 119 so that when the machine is at rest the main piston 73 holds the upper auxiliary piston 120 in the lower position shown in Figure 6, but the lower auxiliary piston 118 is held in its uppermost position with the valve 117 closed. When the compressor is started and hydraulic pressure is built up in cylinder 30 through the pipe 29 this pressure is transmitted to the main piston 73 through ports 113 and the main piston is raised until it reaches the position shown in Figure 7. This pressure is equalized on both sides of the upper auxiliary piston 120 through the port 123 so that this piston is moved to its uppermost position by the spring 122. Likewise this pressure is equalized on both sides of the lower auxiliary piston 118 through port 123 and ports 115.

Now when the pressure in the hydraulic system, including pipe 29 and the cylinder 30, drops, the main piston 73 drops until the flat end of the projection 121 engages and closes the port 123 and thus traps the oil between the two auxiliary pistons. Further downward movement of the main piston 73 then causes a corresponding downward movement of the lower auxiliary piston 118 to lower the vent valve 117 from its seat and thus open valve port 116. This position of the valve and lower auxiliary piston is indicated in dotted lines in Figure 6. The pressure in the hydraulic system is thus further reduced by the escape of oil through the valve port 116 to the crank case 14. In this position of the parts the lower auxiliary piston is somewhat below the ports 114 in the auxiliary cylinder 112. The spring 119 presses the lower piston 118 upwardly and the oil between the auxiliary pistons is first forced out through the ports 114 and finally slowly leaks around the auxiliary pistons until the lower piston finally reaches its uppermost position and the valve port 116 is again closed. This does not occur however until sometime after the pressure in the hydraulic system has been sufficiently reduced to stop the compressor.

As previously pointed out the individual control for each compressor includes a fluid pressure governor in addition to the hydraulic system and associated parts thus far described. This governor may assume various forms. In the present instance it includes a main casting 124 (see Figs. 10 and 11) preferably mounted upon the auxiliary reservoir 58 hereinabove referred to. The auxiliary reservoir is mounted at any convenient point such as upon one of the compressor cylinders 8, and communicates through a pipe 125 (see Figs. 14 and 15) with a chamber 126 formed in the cylinder head 127 of the cut-out switch operating cylinder 28, so that when a predetermined fluid pressure has been established in the auxiliary reservoir by the admission of fluid thereto, the pressure in the hydraulic system is reduced by means which will now be described.

A valve 128 is yieldably held upon its seat by a spring 129 to close a port 130 between the cylinder 28 and a chamber 131. A discharge pipe 132 leads from the chamber to the interior of the crank case 14. Valve 128 is connected with and actuated by a piston 133 arranged above the chamber 126 and influenced by the fluid pressure in the chamber 126, pipe 125 and the auxiliary reservoir 58. When the piston is raised by the fluid pressure against the action of spring 129, the port 130 is opened and oil in the cylinder 28 escapes into the chamber 131 and is returned to the crank case 14 through pipe 132. This obviously reduces the pressure in the entire hydraulic system and effects the unloading and the stopping of the compressor.

Under certain conditions of operation it has been found desirable to retard or delay the action of the cut-out switch. For instance when the compressor is to be brought to rest under the influence of the fluid governor it is desirable to retard or delay the opening movement of the cut-out switch in order to insure that the compressor has been completely unloaded before the starting resistance is reinserted. On the other hand when the compressor is to be brought to rest because of the presence of some improper working condition it is obviously desirable that the cut-out switch be free to open quickly in order to break the motor circuit as soon as possible. This is particularly true in the event that the seat of the trouble is in the power circuit or motor.

Various means may be provided for effecting these purposes. The means which will now be described however has been found to give excellent results. This means includes a disk 200 preferably of metal secured in the bottom of the cylinder 28. The disk is provided with a large port 201 for cooperation with the valve 128. A groove or slot 202 is formed in the flat top of the valve so that when the valve has been lifted to the position shown in Figure 15 the port 201 is closed, but the oil in the cylinder 128 is permitted to escape slowly through the groove 202 in the valve head. This is the position assumed by the parts when the compressor is brought to rest by the influence of the fluid governor. This condition of the parts obviously insures a very slow opening movement of the cut-out switch thus giving sufficient time to effect a complete unloading of the compressor before the resistance has been fully inserted. When the compressor is brought to rest due to its falling below speed, as a result of improper working condition, the valve 128 remains in its normal lower position and the oil is free to escape in considerable quantities through the large port 201 and thus permit a relatively quick opening of the cut-out switch and consequently a quick release of the main switch to break the motor circuit.

Fluid is admitted to the auxiliary reservoir 58 through a duct 134 (see Figs. 10 and 11) communicating with an annular channel 135 formed in the main casting 124 of the fluid governor. A cylinder 136 is preferably removably fixed within a suitable opening formed in the casting 124 and is provided with a plurality of ports 137 communicating with the channel 135. A piston 138 having an annular projection 139 is adapted to open and close the ports 137. One end of the piston is preferably reduced and is hollowed out to form a small chamber 140 and an annular flange 141 for controlling the flow of fluid through a passageway 142. An air tight connection is formed at this point by the use of any appropriate packing materal 143 such as leather. Thus it will be understood that when the piston 138 is in the upper position shown in Figure 11 fluid under pressure may pass from the passageway 142 through ports 137, channel 135 and duct 134 to the interior of the reservoir 58. Fluid is admitted to the passageway 142 by means of a pipe 144 which may be connected with the main reservoir 12. A suitable straining chamber 145 is preferably interposed between the pipe 144 and passageway 142.

A plunger 146 under the influence of a spring 147 normally retains the piston 138 in the lowermost position shown in Figure 10, with the flange 141 thereof seated tightly against the leather seat 143, thus preventing the admission of fluid to the auxiliary reservoir. A suitable nut 148, preferably screwed into the spring housing 149 serves as a bearing for the plunger and as a means for adjusting the tension of the spring 147. The upper end of piston 138 cooperates with a seat 150 for controlling a valve port 151 between the interior of the spring housing 149 and a second duct 152 communicating with the interior of the auxiliary reservoir 58. The interior of spring housing 149 is always in communication through the pipe 57 hereinabove referred to with the cylinder head 52 of the main switch operating cylinder 47. When the piston 138 is in the lowermost position, just described, the auxiliary reservoir is therefore in communication with the main switch closing mechanism. When the piston is raised to its uppermost position of Figure 11 however, this communication is cut off and communication is reestablished between the pipe 144 and the auxiliary reservoir.

The means for controlling piston 138 will now be described. This means includes a trip valve 153 yieldably held against a seat 154 to control the flow of fluid through a valve port 155 communicating with pipe 144 through the straining chamber 145. A plunger 156 under the influence of a spring 157 yieldably holds the valve 153 against its seat. A suitable nut 158 serves as a bearing for the plunger and a means for adjusting the tension in spring 157.

The tension of spring 147 is such that when piston 138 is in its lowermost position the maximum pressure established in passageway 142 is not sufficient to raise the piston off its seat, due to the fact that when the piston is in this position the fluid pressure from passageway 142 is applied to only that limited area of the piston within the flange 141. The tension of spring 157 is such that when a predetermined maximum pressure is established in the valve port 155 the valve 153 is lifted from its seat to open communication between the valve port 155 and a passageway 159 leading to the bottom of the cylinder 136. The upper position of valve 153 is indicated in dotted lines in Figure 11. When this occurs the fluid pressure established from pipe 144 through the straining chamber 145 acts through passageways 142 and 159 over a larger area of the piston 138 with the result that the resistance of spring 147 is overcome and the piston 138 is raised to its uppermost position of Figure 11. As above pointed out, such position of the piston opens communication between the pipe 144 and the duct 134 leading to the auxiliary reservoir 58 and closes communication between the duct 152 leading from the auxiliary reservoir and the pipe 57 leading to the main switch operating cylinder. Fluid thus enters the auxiliary reservoir until a pressure has been established therein corresponding to the pressure in pipe 144. In the mean time the pressure in the auxiliary reservoir is transmitted to the top of the trip valve 153 through the duct 152 and a passageway 160 so as to permit the valve to return to its seat 154 under the influence of the spring 157.

The pressure thus established in the auxiliary reservoir 58 is transmitted through the pipe 125 to the chamber 126 formed in the cylinder head 127 of the cut-out switch operating cylinder 28 to vent the hydraulic system and thus stop the compressor and its driving means in the manner hereinabove described. The parts remain in this condition until the pressure in the pipe 144 has fallen below a certain minimum. This may be determined by the tension in spring 147. When this occurs spring 147 forces the piston 138 to its lowermost position of Figure 10 and thus cuts off communication between pipe 144 and the auxiliary reservoir and opens communication between the auxiliary reservoir and the pipe 57 leading to the main switch operating cylinder. The main switch is thus closed and the motor and compressor are started in the manner hereinabove described.

The operation of the entire control system for each compressor will now be briefly summarized. When the compressor is at rest the main switch 33 and cut-out switch 62 are open and the piston 73 in the accumulating cylinder is in the lowermost position of Figure 6. Valve operating lever is consequently in such position as to effect communication between pipe 88 and pipe 94 so that pipe 94 is under main reservoir pressure and the compressor is unloaded. Under normal conditions the fluid governor is at this time in the condition shown in Figure 11, that is,—the piston 138 is in its uppermost position and the valve 153 is in its lowermost position; and the auxiliary reservoir 58 contains fluid at a pressure corresponding to the pressure in pipe 144.

As soon as the pressure in pipe 144 has been reduced below a certain minimum, piston 138 is forced to its lowermost position and fluid passes from the auxiliary reservoir 58 through pipe 57 to the main switch operating cylinder 47. This causes the closing of the main switch and the starting of the motor. Assuming that sufficient oil is present in the crank case 14, the starting of the motor causes the pump 16 to set up a pressure in the pipes 25, 26 and 29 corresponding substantially to the speed of the motor. Thus as the motor builds up speed a corresponding increase of pressure is set up in the cut-out switch cylinder 28 until the cut-out switch is closed and the latch lever 61 is released. If the compressor, motor, and motor circuit are in proper working condition this action occurs and the main switch is latched in closed position before the fluid pressure in the main switch cylinder 47 has been depleted by leakage through the bleed opening 59.

At the same time the pressure in the accumulating cylinder 30 is building up so that when the motor and compressor have reached full speed the pressure has so increased that the piston 73 is raised and the valve operating lever 81 has been shifted to the position shown in Figure 7. This position of lever 81 and its valve disk 84 establishes communication between pipe 94 and the atmospheric duct 95 so that the pressure in pipe 94 is reduced to atmospheric pressure and the compressor is loaded by the release of the inlet valve 9. At the same time pipe 93 is placed in communication with pipe 88 so that main reservoir pressure is established in pipe 93 and water is supplied to the cooling system through valve port 101.

When the pressure in pipe 144 assumes a certain maximum pressure trip valve 153 is raised and then piston 138 is raised to the uppermost position of Figure 11 and communication is established between pipe 144 and the auxiliary reservoir and communication between the auxiliary reservoir and pipe 57 is cut off. Fluid is thus again supplied to the auxiliary reservoir until the pressure therein corresponds to that in pipe 144. This pressure is transmitted through pipe 125 to the chamber 126 so that the vent valve 128 is raised and the oil in the cylinder 28 is permitted to escape through port 130. This effects a reduction in pressure in the entire hydraulic system so that the piston 73 is first lowered to unload the compressor and the cut-out switch piston 64 is lowered to open the cut-out switch and trip the latch lever 61 to release and open the main switch and stop the motor and compressor.

The means and method of controlling the operation of all of the several compressors shown in Figure 1 will now be described. From the foregoing description it will be understood that when all the parts of each compressor are in proper working condition the starting and stopping of each compressor and its individual motor is controlled by the degree of fluid pressure in each pipe 144. It will also be understood that when a compressor is at rest and unloaded the pressure in pipe 94 is substantially equal to main reservoir pressure and that after a compressor and its motor have reached full speed and have been loaded the pressure in pipe 94 has been reduced to atmospheric pressure.

Any one of the compressors, for instance that indicated by the letter A in Figure 1, is selected as a pilot machine and is started or stopped in accordance with the pressure in the main reservoir 12. The other compressors are connected one with another and with the pilot compressor in such manner that the starting and stopping of each of the other compressors is influenced by the starting or stopping of the other compressors. For this purpose the pipe 144 of the compressor A is connected at all times with the main reservoir 12 through a pipe 161; the pipe 144 of compressor B is connected with pipe 94 of compressor A through pipe 162 and the pipe 144 of compressor C is connected with pipe 94 of compressor B through pipe 163. Thus when all of the compressors are at rest the fluid in each pipe 144 is under a pressure corresponding to the pressure in the main reservoir 12, since at this time the pressure in each pipe 94 corresponds to main reservoir pressure. This general scheme of connections may be applied to any number of compressors feeding to a common reservoir.

In practice the adjustment of the fluid governors for the several compressors is such that compressor B will start at a somewhat lower starting pressure than compressor A, and compressor C will start at a somewhat lower starting pressure than compressor B. Thus as the pressure in the main reservoir 12 falls it effects a corresponding drop in pressure in each of the pipes 144, but the governor of A compressor is the first to be actuated and compressor A is started. If in proper working condition this compressor and its motor gradually come up to its full speed setting up a corresponding increased pressure in its hydraulic system. As compressor A approaches full speed the piston 73 in the accumulating cylinder 30 is raised, the valve lever 81 is actuated and the fluid pressure in pipe 94 is reduced to atmospheric pressure to effect the loading of the compressor in the manner above described. This reduction in pressure in pipe 94 of compressor A effects a corresponding reduction in pipe 162 and in pipe 144 leading to the fluid governor of compressor B so that compressor B is then started. Likewise as compressor B comes up to full speed the pressure in pipe 94 of that compressor, and in pipe 144 of compressor C, is reduced to atmospheric pressure and compressor C is started.

In like manner a fourth compressor might be connected with compressor C and started in a similar manner when compresor C has attained full speed.

The stopping of the several compressors is effected in a similar manner and in the same order. When a predetermined maximum pressure has been attained in the main reservoir 12 this pressure is of course, transmitted to pipe 144 leading to the governor of compressor A and this compressor is unloaded and stopped in the manner hereinabove described. As above pointed out the unloading of this compressor is effected by the admission of main reservoir pressure in pipe 94. This reservoir pressure is then transmitted to the governor of compressor B through pipe 162 and pipe 144 and compressor B is unloaded and brought to rest. Compressor C is unloaded and stopped in a similar manner when the pressure in pipe 94 of compressor B has been placed under main reservoir pressure. Thus it will be seen that when all the compressors are in proper working condition they will all be started and stopped in accordance with the degree of pressure in the main reservoir, and each compressor will operate substantially the same length of time as each of the others.

Should compressor A, for any cause, fail to operate or to come up to its rated speed when the pressure in the main reservoir has fallen to the starting pressure for compressor A, none of the other compressors will start until the main reservoir pressure has further lowered to the starting pressure for compressor B. Compressor B will then start, come up to speed, and take its load and effect the starting of compressor C. Should compressor B fail to start, however, compressor C will not start until the pressure in the main reservoir has further fallen to the starting pressure for compressor C.

Thus it will be seen that by the system just described each compressor serves as a pilot for controlling the starting and stopping of the next succeeding compressor. Assume however, that the pressure in the main reservoir should fall to such point as to start compressor A and this compressor would continue to operate and take its load in the usual manner but that compressor B for some cause or other would fail to start or come up to speed. Compressor B would consequently not effect the starting of compressor C. Under these circumstances compressor A would probably maintain the pressure in the main reservoir above the starting pressure for compressor C and compressor C would not be started. Compressor A would then carry the entire load. Such a condition may be avoided by placing compressor C under the control of compressor A in such a way that, if compressor B fails to operate and effect the starting of compressor C within a certain time, compressor C will start independently of compressor B.

This may be accomplished by means such as shown in Figures 1, 12 and 13 of the drawings. This means includes a fluid cylinder 164 interposed in pipe 163 between the pipe sections 163$^1$ and 162$^2$ connected with pipe 94 of compressor B and pipe 144 of compressor C. An atmospheric port 165 is formed near one end of the cylinder 164. A pipe 166 connects the other end of the cylinder with pipe 162 so that the fluid pressure in that end of the cylinder corresponds at all times with the pressure in pipe 162 and pipe 94 of compressor A. A plunger 167 is reciprocably mounted in the cylinder and is provided with a reduced portion 168 and a duct 169.

A dash-pot mechanism of any approved type is associated with the plunger 167 for retarding the speed of motion thereof. In the present instance this mechanism includes a cylinder 170 preferably rigidly secured to the cylinder 164 and having a piston 171 reciprocable therein. Piston 171 is preferably rigidly connected with plunger 167 by means of a rod 172. A weak spring 173 tends at all times to move the piston and plunger in one direction while these parts are moved in the other direction under the influence of fluid pressure admitted through pipe 166. The cylinder 170 is filled with oil or other fluid which is permitted to flow through a by-pass 174 from either end of the cylinder to the other. The speed of flow through the by-pass and hence the speed of movement of the piston and plunger is nicely controlled by means of a needle valve 175 of any approved type.

When the compressors are at rest the fluid in pipe 94 of compressor A, pipes 162 and 166 and the left end of cylinder 164 is under main reservoir pressure, and the plunger 167 is held in the right end of cylinder 164 against the action of spring 173. In this position of the parts pipe sections 163$^1$ and 163$^2$ are in communication around the reduced portion 168 of the plunger 167 and compressor C is under the direct control of the pressure in pipe 94 of compressor B. When compressor A has been started and comes up to speed the pressure in pipe 94 thereof is reduced to atmospheric pressure, in the manner hereinabove described, and a consequent reduction of pressure in pipes 161 and 166 and in the cylinder 164 is effected. Spring 173 then moves the plunger 167 to the left at a speed dependent upon the adjustment of needle valve 175. The first effect of the plunger 167 is to cut off communication between pipe sections 163$^1$ and 163$^2$. This occurs as the plunger 167 reaches an intermediate position. This position is not ordinarily reached however, until such time as will give the compressor B sufficient opportunity to start under the influence of compressor A and to come up to speed and effect the starting of compressor C. The plunger 167 continues to move to the left until duct 169 thereof is brought into register with pipe section 163$^2$, thus effecting communication between this pipe section and the atmospheric port 165 in the cylinder 164. Thus it will be seen that unless the pressure in the pipe section 163$^2$ has already been reduced to atmospheric pressure due to the starting and full speed operation of compressor B it will at this time be reduced through the atmospheric port 165. This reduction in pressure in pipe section 163$^2$ obviously effects the starting of compressor C. The plunger 167 continues to move idly to the left end of cylinder 164 as shown in Figure 13.

A similar connection may be made between compressor B and a fourth machine not shown. In that instance a pipe 166¹ connects the pipe section 163² with a similar fluid cylinder 164¹ interposed in a pipe line 176 between compressor C and a fourth machine. Thus the starting of a fourth compressor may be effected not only by the starting and operation of compressor C but also by a drop in pressure in pipe section 163² which is in turn effected by the starting and operation of either compressor B or compressor A.

The manner of bringing the several compressors to rest will now be described. When the pressure in the main reservoir 12 has been raised to the predetermined maximum, compressor A is unloaded and stopped. As above pointed out the pressure in pipe 162 is increased to main reservoir pressure by this operation and a corresponding pressure is set up in pipe 166 and cylinder 164. The plunger 167 is thus moved slowly to the right and communication between pipe section 163² and atmospheric port 165 is cut off and finally communication is re-established between the pipe sections 163¹ and 163². When this occurs compressor C is again under the control of compressor B and is brought to rest as soon as compressor B has stopped. It is obvious that if compressor B is already at rest, compressor C will be brought to rest as soon at this communication is established, since the pressure in pipe section 163¹ would then be at main reservoir pressure. As soon as reservoir pressure has been re-established in pipe section 163² this pressure will be transmitted to the second air cylinder 164¹ through pipe 176 and the fourth machine would be again placed under the direct control of compressor C. The fourth machine would then be brought to rest after, and by reason of the fact that, compressor C has been brought to rest. Thus it will be seen that all of the compressors are brought to rest in the order of their starting.

In the event that it is desired to operate any one of the compressors independently of the others pipe 144, leading to the fluid governor of each compressor B or C, is connected directly with the main reservoir 12 by means of a pipe 179 or 180, respectively. Any appropriate means such as a threeway valve 181 or 182 may be employed for establishing communication between pipe 144 of compressor B and either pipe 162 or pipe 179; or between pipe 144 of compressor C and either pipe 163 or pipe 180 as the case may be. Thus any one of the compressors may be made independent of the other so that they may be independently started or stopped in the usual manner, each being entirely dependent upon the fluid pressure in the main reservoir.

Numerous changes may be made in the invention hereinabove described without departing from or sacrificing any of the advantages of the invention defined in the following claims.

I claim:

1. In a power system, the combination of a plurality of separate units each adapted to supply energy to the system and connections between said units for starting or stopping one of said units in accordance with the active or inactive condition of another of said units.

2. In a power system, the combination of a plurality of separate units each adapted to supply energy to the system, and means for effecting the successive starting of said units when the energy in the system has fallen to a predetermined minimum degree.

3. In a power system, the combination of a plurality of separate units each adapted to supply energy to the system, means for starting or stopping one of said units in accordance with the amount of energy in the system, and means for effecting the starting or stopping of another of said units in accordance with the active or inactive condition of said first named unit.

4. In a power system, the combination of a plurality of units each adapted to supply energy to the system, a separate motor for driving each unit, and connections between said units for starting or stopping one of said units in accordance with the active or inactive condition of another of said units.

5. In a power system, the combination of a plurality of units each adapted to supply energy to the system, a separate motor for driving each unit, and means for effecting the successive starting of said motors when the energy in the system has been reduced to a predetermined minimum degree.

6. In a power system, the combination of a plurality of units each adapted to supply energy to the system, a separate motor for driving each unit, means for starting or stopping one of said motors in accordance with the amount of energy in the system, and means for effecting the starting or stopping of another of said motors in accordance with the active or inactive condition of said first mentioned motor.

7. The combination of a system for storing energy, a plurality of separate units each adapted to supply energy to said system, connections between one of said units and said system for starting or stopping said unit in accordance with the amount of energy in said system, and connections associated with said unit and connecting another of said units with said system for starting or stopping said second mentioned unit in accordance with the active or inactive condition of said first mentioned unit.

8. The combination of a system for storing energy, a plurality of separate units each adapted to supply energy to said system, direct connections between one of said units and said system for starting or stopping said unit in accordance with the amount of energy in said system, and connections between each of said other units and said system and through some other unit whereby the starting or stopping of each of the other units depends either upon the starting or stopping of another unit or upon the amount of energy in said system.

9. The combination of a system for storing energy, a plurality of separate units each adapted to supply energy to said system, means for starting one of said units when the energy in said system has been reduced to a predetermined minimum, means controlled by said unit for starting another of said units, and means controlled by either said first mentioned unit or said second mentioned unit for starting a third unit.

10. In a system of the character described, the combination of a plurality of independently driven units and connections between said units for starting one of said units in accordance with the active condition of any preceding one of the other units.

11. In a system of the character described, the combination of a plurality of separate units, means for starting or stopping one of said units, connections between said unit and a second unit for rendering said second unit active after said first mentioned unit has been started, connections between said second mentioned unit and a third unit for rendering said third mentioned unit active after said second mentioned unit has been started, and means controlled by said first mentioned unit for rendering said third mentioned unit active in case said second mentioned unit does not start within a certain period after said first mentioned unit has been started.

12. The combination of a system for storing energy, a plurality of separate units each adapted to supply energy to said system, and means for rendering said units active in accordance with different amounts of energy in said system, said means including connections between said units for starting one of said units in accordance with the active condition of another of said units.

13. The combination of a fluid container, a plurality of compressors for feeding said container, and means for rendering said compressors active in accordance with different degrees of pressure in said container, said means including connections between said units for starting one of said compressors in accordance with the active condition of another of said compressors.

14. The combination of a plurality of separate compressors, means for starting or stopping one of said compressors, and means for starting or stopping another of said compressors in accordance with the active or inactive condition of said first mentioned compressor.

15. The combination of a fluid container, a plurality of compressors for feeding said container, and means for effecting the successive starting of said compressors when the pressure in said container has fallen to a predetermined degree.

16. The combination of a fluid container, a plurality of compressors for feeding said container, means controlled by pressure in said container for starting one of said compressors, and means controlled by said compressor for starting another compressor.

17. The combination of a plurality of separate motors, means for starting one of said motors, means for loading said motor after said motor has come up to speed, and means controlled by said loading means for starting another of said motors.

18. The combination of a plurality of separate motors, means for starting and stopping one of said motors, and means controlled by said motor for starting and stopping another of said motors after it has itself started or stopped.

19. The combination of a plurality of compressors, driving means therefor, means for starting one of said compressors, means for loading said compressor after said compressor has come up to speed, and means controlled by the speed of said compressor for starting another of said compressors.

20. The combination of a plurality of compressors, separate driving means therefor, means for starting and stopping the driving means of one of said compressors, and means controlled by the speed of said compressor for starting another of said compressors.

21. The combination of a fluid container, a plurality of compressors adapted to feed said container, said compressors being operable when the pressure in said container is between certain maximum and minimum pressures, and means for rendering one of said compressors active after another of said compressors has been started.

22. The combination of a plurality of separate machines, a fluid system associated with each machine, means for establishing a pressure in each fluid system in accordance with the speed of each machine, and means controlled by the fluid system in one of said machines for starting or stopping another of said machines.

23. The combination of a machine, driving means therefor, a fluid system associated with said machine, means for forcing fluid into said system in accordance with the speed of said machine, said system having an escapement orifice whereby the fluid pressure in said system is dependent upon the speed of said machine, and a member movable over said orifice to prevent the accumulation of sediment therein.

24. The combination of a compressor, driving means therefor, a hydraulic system connected with said compressor and including a cylinder, a piston reciprocable in said cylinder, a groove formed between the wall of said cylinder and said piston, and means for forcing liquid into said system in accordance with the speed of said compressor, said groove forming an escapement opening for said liquid.

25. The combination of a compressor, a driving motor, a starting resistance cut-out switch for said motor, means controlled by the speed of said motor for first closing said switch and then loading said compressor during an increase in the speed of said motor, said means being operable to unload said compressor and open said switch during a decrease in the speed of said motor, a fluid pressure governor for effecting the stopping of said compressor, and means for retarding the opening of said switch under the influence of said governor.

26. The combination of a switch, a cylinder, a fluid pressure system, a port for effecting communication between said cylinder and said system, a piston in said cylinder for actuating said switch, and a valve operated independently of said system for reducing the flow of fluid through said port and thus retard the movement of said piston.

27. In combination, a plurality of power units, and means for throwing said units into operation successively in a predetermined sequence, and for throwing them out of operation in the same sequence.

28. In combination, a plurality of power units, and automatic control connections connecting said units in series for throwing them into and out of operation in a predetermined sequence.

29. In combination, a plurality of power units, automatic control connections connecting said units in series for throwing them into operation successively, and additional automatic control connections by-passing certain units, whereby failure of the by-passed unit to operate will not prevent operation of the following units.

30. In combination, a plurality of power units, a system connected to receive energy from all said units, and automatic means for starting all subsequent units whenever one unit is started.

31. In combination, a system for storing energy, a power unit for delivering energy thereto, connections dependent on the energy in the system for automatically starting said unit, a plurality of other units, and automatic connections for starting said other units successively whenever said first unit is started.

32. In combination, a system for storing energy, a power unit for delivering energy thereto, connections dependent on the energy in the system for automatically starting said unit, a plurality of other units, and automatic connections for starting said other units whenever said first unit is started.

33. In combination, a power unit, defect responsive means for preventing operation of said unit in a defective manner or condition, another similar unit, a system connected to receive energy from both units, and automatic control connections for starting as many of said units as are not defective, whenever the supply of energy in said system falls below in a predetermined value.

34. In combination, a power unit, defect responsive means for preventing operation of said unit in a defective manner or condition, a plurality of other similar units, a system connected to receive energy from all said units, and automatic control connections for starting as many of said units as are not defective whenever the supply of energy in said system falls below a predetermined value.

35. In combination, a plurality of power units, interconnections for controlling said units to start and stop them successively, and defect responsive means for one unit for preventing its operation without interrupting the chain of control connections to units on both sides.

36. In combination, a fluid pressure system, a pressure sensitive control device actuated thereby including a piston subject to the pressure on the system and a spring opposing said pressure, means permitting efflux of the fluid in front of said piston at a predetermined rate upon a decrease in pressure, and additional control means for venting the pressure in the system, said additional control means permitting efflux from in front of said piston at a different rate.

37. In combination, a fluid pressure system, a pressure sensitive control device actuated thereby including a piston subject to the pressure on the system and a spring opposing said pressure, means permitting efflux of the fluid in front of said piston at a predetermined rate upon a decrease in pressure, and additional control means for venting the pressure in the system, said additional control means permitting efflux from in front of said piston at a slower rate.

38. In combination, a motor, a compressor driven thereby, a storage reservoir connected to said compressor, automatic means for unloading said compressor and subsequently stopping said motor, connections for operating said automatic means to stop said motor slowly when the reservoir pressure reaches a predetermined maximum value, and means for stopping said motor more quickly in case of defective operation.

39. In combination, a motor, a unit driven thereby, a fluid pressure system, means dependent on the pressure in said system for unloading the driven unit, means also dependent on the pressure in said system for stopping the motor, and an interconnection for operating said unloading and stopping means in either one of two predetermined time relationships.

40. In combination, a motor, a unit driven thereby, a fluid pressure system, means dependent on the pressure in said system for unloading said driven unit, means also dependent on the pressure in said system for stopping the motor, and independent control means for changing the pressure in the system and partially cutting off said stopping means from the system to retard its response to the change of pressure.

41. In combination, a motor, a fluid pressure system, control means sensitive to the pressure in said system for stopping said motor upon failure of pressure for any one of a plurality of reasons, and automatic means responsive to a certain normal condition for causing a failure of pressure and retarding the response of said control means to said failure.

42. In combination, a motor, a unit driven thereby, a fluid pressure system associated with said unit and subject to a failure of pressure upon defective operation of said unit, means sensitive to a failure of pressure in said system for stopping said motor, and means for effecting a normal stopping of said motor by causing a failure of pressure in said system and retarding the response of said stopping means thereto.

43. In combination, a fluid pressure system, a plurality of pressure sensitive control devices associated with said system, and independent means for changing the pressure in said system and retarding the response of one control device to said change in pressure.

44. In combination, a fluid pressure system, a plurality of pressure sensitive devices associated with said system and arranged to operate at different pressures, and means for causing a failure of pressure in said system and retarding the response of the control device operating at the lowest pressure.

45. In combination, a main reservoir, an auxiliary reservoir, a pumping unit for supplying said main reservoir, fluid pressure means for starting said unit, a valve piston movable into two positions, said piston in one position connecting said auxiliary reservoir to said main reservoir and disconnecting it from said fluid pressure means and in the other position connecting said auxiliary reservoir to said fluid pressure means and disconnecting it from said main reservoir, and resilient means engaging said piston to hold it in the second position.

46. In combination, a main reservoir, an auxiliary reservoir, a pumping unit for supplying said main reservoir, fluid pressure means for starting said unit, a valve piston movable into two positions, said piston in one position connecting said auxiliary reservoir to said main reservoir and disconnecting it from said fluid pressure means and in the other position connecting said auxiliary reservoir to said fluid pressure means and disconnecting it from said main reservoir, resilient means engaging said piston to hold it in one position, and means for exposing a differential area of said piston to the main reservoir pressure to move it into the other position.

47. In combination, a main reservoir, an auxiliary reservoir, a pumping unit for supplying said main reservoir, fluid pressure means for starting said unit, a valve piston movable into two positions, said piston in one position connecting said auxiliary reservoir to said main reservoir and disconnecting it from said fluid pressure means and in the other position connecting said auxiliary reservoir to said fluid pressure means and disconnecting it from said main reservoir, resilient means engaging said piston to hold it in one position, and means for exposing a differential area of said piston to the main reservoir pressure to move it into the other position, said last mentioned movement exposing the differential area to the main reservoir pressure regardless of the subsequent action of said exposing means.

48. In combination, a main reservoir, an auxiliary reservoir, a pumping unit for supplying said main reservoir, fluid pressure means for starting said unit, a cylinder, a first passageway from said main reservoir to one end of said cylinder, a second passageway from an intermediate portion of the periphery of said cylinder to said auxiliary reservoir, a third passageway from said auxiliary reservoir to the periphery of said cylinder at the end opposite said first passageway, a fourth passageway from the remaining end of said cylinder to said fluid pressure starting means, and a piston in one position disconnecting the first and second passageways and connecting the third and fourth and in the other position connecting the first and second passageways and disconnecting the third and fourth.

49. In combination, a main reservoir, an auxiliary reservoir, a pumping unit for supplying said main reservoir, fluid pressure means for starting said unit, a cylinder, a first passageway from said main reservoir to one end of said cylinder, a second passageway from an intermediate portion of the periphery of said cylinder to said auxiliary reservoir, a third passageway from said auxiliary reservoir to the periphery of said cylinder at the end opposite said first passageway, a fourth passageway from the remaining end of said cylinder to said fluid pressure starting means, and a piston having a flange for covering and uncovering said second passageway in one position disconnecting the first and second passageways and connecting the third and fourth and in the other position connecting the first and second passageways and disconnecting the third and fourth.

50. In combination, a main reservoir, a pumping unit for intermittently replenishing said reservoir, an auxiliary reservoir, fluid pressure means for starting said unit, a spring pressed piston movable into two positions, and passageways closed and opened by said piston to connect said auxiliary reservoir to said main reservoir in one position of the piston and to said fluid pressure starting means in another position of the piston.

51. In combination, a main reservoir, a pumping unit for intermittently replenishing said reservoir, an auxiliary reservoir, fluid pressure means for starting said unit, a spring pressed piston movable into two positions, passageways closed and opened by said piston to connect said auxiliary reservoir to said main reservoir in one position of the piston and to said fluid pressure starting means in another position of the piston, a second spring held piston adjacent said first piston, and a passageway controlled by said second piston to deliver pressure to an increased area of said first piston when the main reservoir pressure rises beyond a predetermined point.

52. In combination, a main reservoir, a pumping unit for intermittently replenishing said reservoir, an auxiliary reservoir, fluid pressure means for starting said unit, a spring pressed piston movable into two positions, passageways closed and opened by said piston to connect said auxiliary reservoir to said main reservoir in one position of the piston and to said fluid pressure starting means in another position of the piston, a second spring held piston adjacent said first piston, passageways controlled by said second piston to deliver pressure to an increased area of said first piston when the main reservoir pressure rises beyond a predetermined point, one end of said second piston being exposed to the main cylinder pressure, means for bleeding said fluid pressure starting means, and a passageway exposing the other end of said second piston to the auxiliary reservoir pressure.

53. In combination, a main reservoir, a pumping unit for intermittently replenishing said reservoir, an auxiliary reservoir, fluid pressure means for starting said unit, a piston, passageways closed and opened by said piston to connect said auxiliary reservoir to said main reservoir or to said starting means, and a spring pressing on said piston and housed in one of said passageways.

54. In a power system, the combination of a plurality of separate units each adapted to supply energy to the system, and connections between said units rendered operative by starting one of said units for starting another of said units.

55. In a power system, the combination of a plurality of separate units each adapted to supply energy to the system, and connections between said units rendered operative by stopping one of said units for stopping another of said units.

56. The combination of a fluid container, a plurality of compressors for feeding said container, connections between the container and each of said compressors for starting each compressor when the pressure in said container has fallen to a predetermined value, the pressure at which said compressors start decreasing successively, and connections between said compressors for successively starting all said compressors when the first compressor starts, whether the pressure continues to fall or not.

57. In combination, a power-receiving system, a plurality of supply units, and starting means operative when all said units are in working conditions to prevent starting less than all said units when the pressure falls to a predetermined point.

58. In combination, a power-receiving system, a plurality of supply units, starting means operative when all said units are in working condition to prevent starting less than all said units when the pressure falls to a predetermined point, and means for preventing simultaneous starting of any two units.

59. In combination, a power-receiving system, a plurality of supply units arranged to deliver to said system, and means operative when part of said units are in working condition for starting all said units that are in working condition.

60. In combination, a power-receiving system, a plurality of supply units arranged to deliver to said system, means operative when part of said units are in working condition for starting all said units that are in working condition, and means for preventing simultaneous starting of any two units.

61. In combination, a main reservoir, a unit for supplying pressure fluid to said reservoir, an auxiliary reservoir, a main control piston subject to the pressure on said main reservoir, means for driving said supply unit, control means for said driving means, resilient means for shifting said main piston from stopping to starting position when the main pressure falls to a predetermined value, said shift disconnecting said auxiliary reservoir from said main reservoir and connecting it to said control means for the temporary operation of said driving means, additional control means rendered operative by proper starting of said unit for continuing the driving means in operation, a pressure sensitive element continually exposed on one side of the main pressure and on the other to the pressure in the auxiliary reservoir, resilient means for resisting movement of said element up to a predetermined pressure difference, and means rendered operative by movement of said element for shifting said piston back to stopping position.

62. In combination, a main reservoir, a unit for supplying pressure fluid to said reservoir, an auxiliary reservoir, a main control piston subject to the pressure on said main reservoir, means for driving said supply unit, control means for said driving means, resilient means for shifting said main piston from stopping to starting position when the main pressure falls to a predetermined value, said shift disconnecting said auxiliary reservoir from said main reservoir and connecting it to said control means for the temporary operation of said driving means, additional control means rendered operative by proper starting of said unit for continuing the driving means in operation, a pressure-sensitive element continually exposed on one side to the main pressure and the other to the pressure in the auxiliary reservoir, resilient means for resisting movement of said element up to a predetermined pressure difference, and means rendered operative by movement of said element for shifting said piston back to stopping position, said last mentioned piston movement disconnecting said auxiliary reservoir from said starting means and connecting it to said main reservoir.

63. In a compressor, in combination, a fluid pressure system, means tending to generate pressure in said system as a function of the speed of the compressor, load control means for loading and unloading the compressor, a valve actuated by the pressure of the system for determining the action of said load control means, and a quick release valve for relieving the pressure in said system.

64. In a compressor, in combination, an air actuated unloading means for said compressor, a rotary air valve controlling the same, a fluid pressure system, means for generating pressure in said system as a function of the speed of the compressor, an operative connection between said system and said air valve for actuating the latter, and biasing means for giving a snap action to the operation of the loading means.

65. In a compressor, in combination, an air actuated unloading means for said compressor, a rotary air valve controlling the same, a fluid pressure system, means for generating pressure in said system as a function of the speed of the compressor, an operative connection between said system and said air valve for actuating the latter, and biasing means in the fluid pressure system, for giving a snap action to the operation of the system and loading means.

In witness whereof I hereunto subscribe my name this 11th day of March, 1920.

BURTON S. AIKMAN